June 23, 1964    P. F. KING    3,138,209
PIT PLOW WITH FRICTION DRIVE

Filed Oct. 13, 1961    3 Sheets-Sheet 1

Ferdinand P. King
INVENTOR.

BY *Clarence A. O'Brien*
and *Harvey B. Jacobson*
Attorneys

June 23, 1964 P. F. KING 3,138,209
PIT PLOW WITH FRICTION DRIVE
Filed Oct. 13, 1961 3 Sheets-Sheet 2

Ferdinand P. King
INVENTOR.

BY *Clarence A. O'Brien*
and *Harvey B. Jacobson*
Attorneys

June 23, 1964 P. F. KING 3,138,209
PIT PLOW WITH FRICTION DRIVE
Filed Oct. 13, 1961 3 Sheets-Sheet 3

Ferdinand P. King
INVENTOR.

BY Clarence A. O'Brien
and Harvey B. Jacobson
Attorneys

United States Patent Office 3,138,209
Patented June 23, 1964

1

3,138,209
PIT PLOW WITH FRICTION DRIVE
Ferdinand P. King, Rte. C, Box 180, Lamesa, Tex.
Filed Oct. 13, 1961, Ser. No. 144,898
3 Claims. (Cl. 172—105)

This invention relates to a novel and useful type of pit plow and is specifically adapted to provide a means whereby a plurality of pits in a given pattern may be continuously formed to conserve water and/or retain water on land of a sloping nature.

It has long been a known fact that water conservation promotes the growth of plant vegetation and thereby lessens the amount of run-off water and in turn lessens ground erosion.

By forming a plurality of pits in the ground in a predetermined pattern and by seeding applicable grasses in conjunction with the forming of pits previously barren land may be reclaimed and thus rendered productive.

The pit plow of the instant invention is not specifically designed to merely dam lister furrows but instead is specifically adapted to form depressions and/or pits of such nature that by the use of these pits or depressions on range land, abandoned farm land or pasture land, a great percentage of presently barren land may be reclaimed.

By forming a plurality of pits or depressions in barren range land and also performing seeding operations of applicable grasses, the growth of grass vegetation may be more readily initiated in view of the fact that a greater surface area of the ground is exposed for the purpose of absorbing moisture. In addition, not only is there a larger surface area provided to absorb moisture, but the pits or depressions to be formed by the pit plow of the instant invention will be of such dimensions so that in each pit or depression a large number of gallons of water may be collected during relatively heavy and short rainfalls. In this manner, substantially all of a heavy but short rainfall may be retained and prevented from running off and into non-productive gullies and streams.

Depending upon the size of the pit plow provided and the available power to pull the same, pits or depressions of sufficient dimensions to hold in the neighborhood of twenty gallons of water may be provided. By forming a plurality of closely adjacent pits or depressions of this nature it will be readily apparent that an extremely large quantity of water may be retained and prevented from running off into non-productive areas.

Accordingly, it is the main object of this invention to provide a pit plow which may be readily pulled behind a towing vehicle and utilized to form a plurality of depressions and/or pits in a predetermined pattern whereby a large quantity of moisture may be retained after a heavy but relatively short rainfall and thus preventing loss of the majority of the fallen water due to run-off.

A further object of this invention, in accordance with the immediately preceding object, is to provide a pit plow constructed in a manner whereby the pit plow, while forming a plurality of laterally spaced pits and/or depressions intermittently at spaced intervals may be pulled forwardly over the ground with the pitting blade arms effecting a substantially constant and even resistance force to forward movement of the plow in order that the towing vehicle need not be constructed in an extremely rigid

2 manner in order to absorb intermittent rearward pulls being effected by the pit plow towed there behind.

Another object of this invention is to provide a pit plow provided with swingably mounted pitting blade arms constructed in a manner whereby the effective length of the blade arms may be adjusted thereby enabling the depth of the pits and/or depressions formed thereby to be adjusted.

Another object of this invention is to provide a pit plow having rotatably or swingably mounted pitting blade arms drivingly connected to the ground-engaging wheels of the pit plow by means of an adjustable friction drive connection whereby the striking of the blade arms with a hard and unyielding object will enable the pit plow to continue forward movement without rendering extreme damage to the pitting blade arms.

A final object to be specifically enumerated herein is to provide a pit plow in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
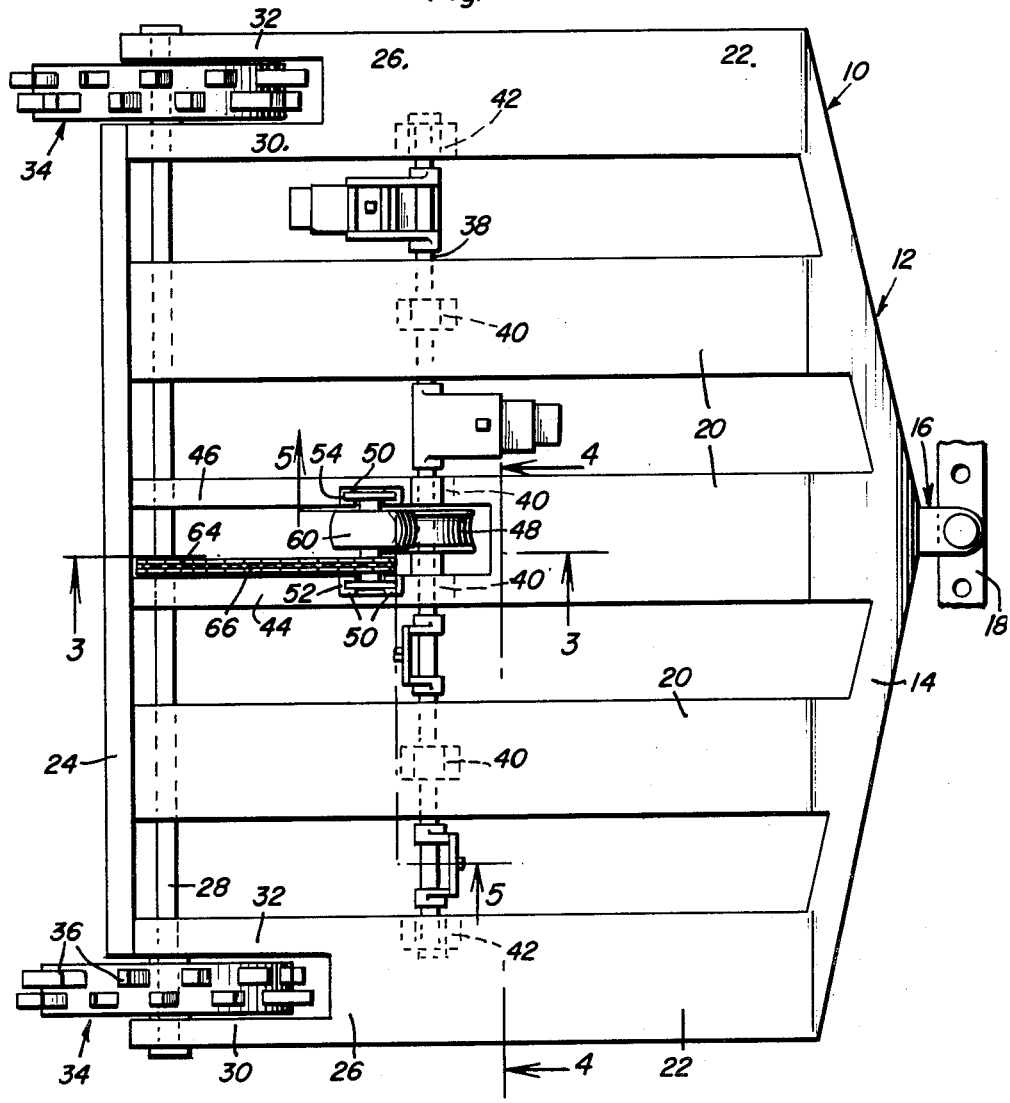
FIGURE 1 is a top plan view of the pit plow of the instant invention.

Referring now more specifically to the drawings the numeral 10 generally designates the pit plow of the instant invention which includes a main frame generally referred to by the reference numeral 12 provided with a header bar 14 on which there is secured a bifurcated hitch assembly generally referred to by the reference numeral 16. The hitch assembly 16 may be removably secured to a towing frame 18 of a towing vehicle (not shown). The frame 12 includes a plurality of longitudinal frame members 20 which each extend rearwardly from the header bar 14 and also a pair of opposite side longitudinally extending frame members 22 which also extend rearwardly from the header bar 14. A rear transverse frame member 24 is secured between the rear ends of the longitudinal frame members 20 and 22 and it will be noted that the rear ends of the frame members 22 are bifurcated as at 26. An axle 28 is journalled for rotation through the rear ends of the longitudinal frame members 20 and the furcations 30 and 32 of the frame members 22. A pair of ground-engaging wheels generally referred to by the reference numerals 34 are secured on the axle 28 for rotation therewith and are disposed between corresponding pairs of furcations 30 and 32. It will be noted that the ground-engaging wheels 34 each include a plurality of radially extending ground-engaging elements 36 whereby the ground-engaging wheels 34 will be capable of establishing a good frictional engagement with the ground over which the pit plow 10 is being pulled.

A driven shaft 38 is journalled from the main frame 12 by means of journal blocks 40 carried by the frame members 20 and journal blocks 42 carried by the frame members 22.

It will be noted that the center frame member 20 is also bifurcated at its rear end and includes a pair of furcations 44 and 46.

A friction drum 48 is mounted on the driven shaft 38 for rotation therewith and it will be noted that each of the furcations 44 and 46 has a pair of confronting generally U-shaped slide guides 50 recessed therein in which slide plate 52 and 54 are received. The slide plates 54 are each apertured as at 56 and rotatably journal one end of an intermediate shaft 58. The intermediate shaft 58 has a friction drive wheel 60 mounted thereon and for rotation therewith and also a sprocket wheel 62. The axle 28 has a sprocket wheel 64 mounted thereon and for rotation therewith and an endless flexible chain 66 drivingly connects the sprocket wheel 64 to the sprocket wheel 62.

Each of the slide plates 54 is secured to one end of an extensible motor generally referred to by the reference numeral 68 as at 70 and thus it may be observed that the intermediate shaft 58 may be moved laterally of the driven shaft 38 for moving the friction drive wheel 60 into and out of frictional engagement with the drum 48.

It is to be understood that suitable controls will be provided for actuating the extensible motor 68.

Figure 8:
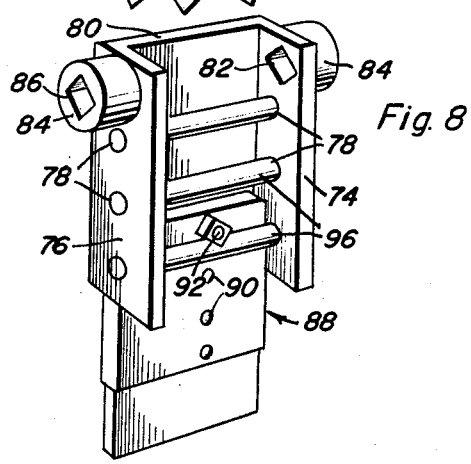
FIGURE 8 is a perspective view of one of the elongated pitting blade arms of the instant invention.
Figure 4:
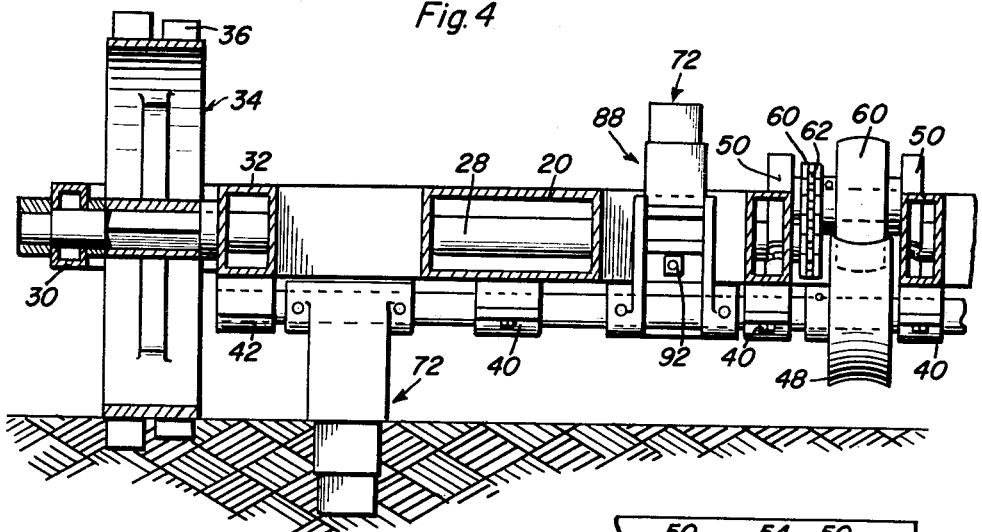
FIGURE 4 is a fragmentary enlarged transverse vertical sectional view taken substantially upon the plane indicated by the section line 4—4 of FIGURE 1.
Figure 5:
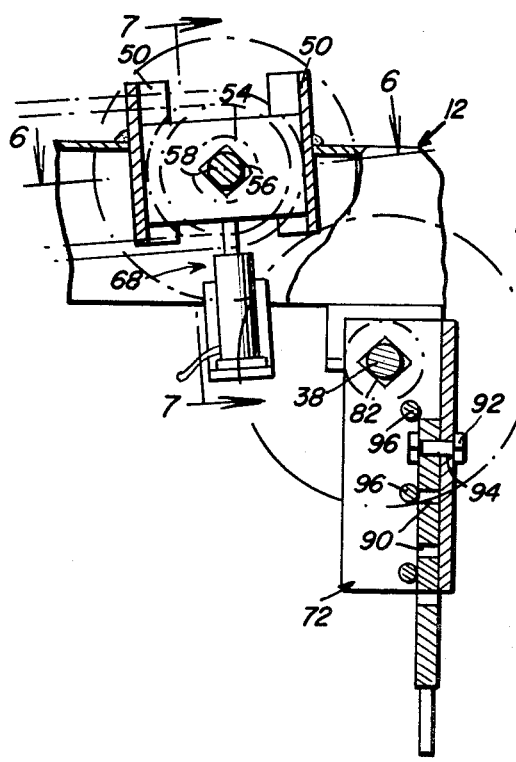
FIGURE 5 is a fragmentary longitudinal vertical sectional view on somewhat of an enlarged scale and taken substantially upon the plane indicated by the section line 5—5 of FIGURE 1.
Figure 6:
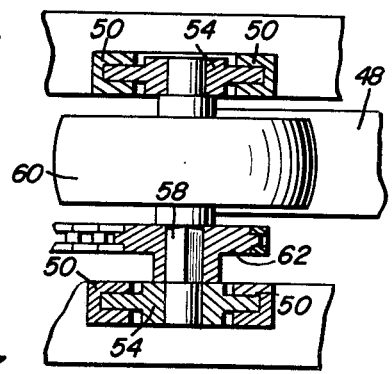
FIGURE 6 is a fragmentary horizontal sectional view taken substantially upon the plane indicated by the section line 6—6 of FIGURE 5.
Figure 7:
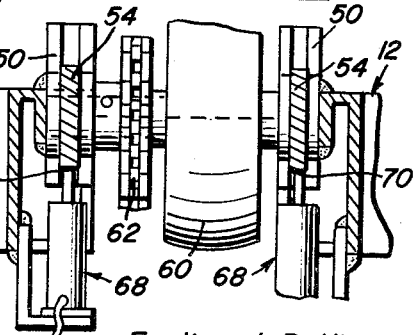
FIGURE 7 is a fragmentary vertical sectional view taken substantially upon the plane indicated by the section line 7—7 of FIGURE 5.

With attention now directed to FIGURES 1, 5 and 8 of the drawings it will be seen that a plurality of elongated pitting blade arm assemblies generally referred to by the reference numerals 72 are provided and that each includes a mounting base which is generally U-shaped in configuration and includes a pair of journal legs 74 and 76 which are each apertured as at 78 and which are interconnected by means of a bight portion 80. The legs 74 and 76 are each provided with a non-circular opening 82 which slidingly receives a correspondingly shaped portion of the shaft 38. In addition, a pair of journal blocks 84 and each provided with a non-circular opening 86 complementary in cross section to the corresponding opening 82 and alined therewith is secured to each of the legs 74 and 76.

Each of the pitting blade arm assemblies 72 includes an extendible arm portion generally referred to by the reference numeral 88 which is provided with a plurality of longitudinally spaced apertures 90 through a selected one of which a fastener 92 may be secured. The fastener 92 is additionally secured through an aperture 94 formed in the bight portion 80 of the corresponding pitting blade arm assembly 72 and a plurality of retaining rods 96 have their remote ends secured in the pairs of aligned apertures 78 formed in the legs 74 and 76 of each pitting blade arm assembly 72. In this manner, it will be noted that the fastener 92 may be secured in a selected one of the openings 90 of the corresponding extendible outer end portion whereby the penetration of the outer end portions 88 into the ground 98 may be adjusted.

It will be noted that each of the shafts 38 and 58 and the axle 28 includes non-circular portions to which the pitting blade arm assemblies 72, friction drive wheel 60 and ground-engaging wheels 34 respectively are secured.

Thus, it may be seen that herein described is a pit plow which may be readily pulled over the ground 98 in order to form a plurality of elongated pits and/or depressions therein of sufficient dimensions to enable the pits and/or depressions to each collect as much as twenty gallons of water during a heavy but relatively short rain in order that the collected water may slowly be absorbed into the ground 98 rather than running over the surface thereof and eroding the ground 98.

Figure 2:
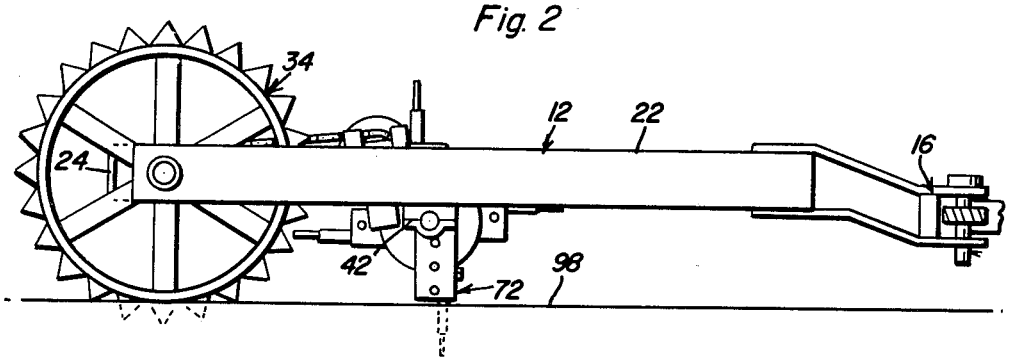
FIGURE 2 is a side elevational view of the pit plow.
Figure 3:
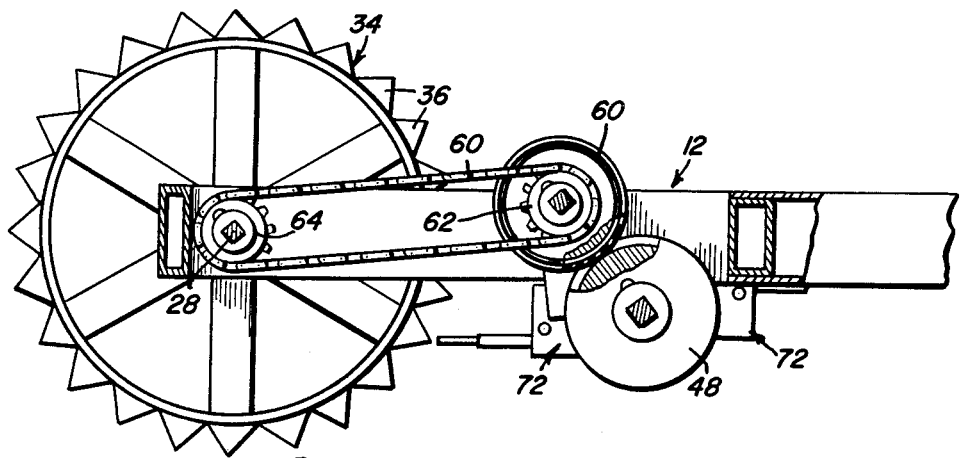
FIGURE 3 is a fragmentary longitudinal vertical sectional view on somewhat of an enlarged scale and showing the manner in which the ground-engaging wheels of the pit plow are drivingly connected to the driven shaft on which the pitting blade arms are mounted by means of a friction drive connection, and taken substantially upon the plane indicated by the section line 3—3 of FIGURE 1.

From FIGURE 2 of the drawings it will be noted that the pitting blade arm assemblies 72 are spaced substantially evenly and circumferentially about the driven shaft 38. In this manner, the plow 10 may be pulled by means of a towing vehicle with the plow 10 exerting a substantially constant drag rather than intermittent dragging forces.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pit plow comprising a heavy longitudinally extending frame including front and rear transverse frame members, a plurality of generally parallel and transversely spaced longitudinal frame members secured at their front and rear end portions to said front and rear transverse frame members, respectively, a pair of heavy ground-engaging drive wheels journaled from the rear of said frame and disposed on opposite sides thereof for rotation about axes extending transversely of said frame, a driven shaft, a journal carried by each of said longitudinal members intermediate said transverse members and forwardly of said axes, said journals being aligned, and journaling said driven shaft for rotation about an axis generally paralleling said axes, a plurality of elongated extensible pitting blade arms secured to and extending generally radially outwardly from said driven shaft, said arms being singly disposed between adjacent ones of said longitudinal members, having their outer ends generally equally spaced circumferentially about said driven shaft, and each individually swingable through a corresponding circular path about said driven shaft disposed in a plane extending transversely of said driven shaft and spaced longitudinally of said driven shaft from the planes in which the paths of movement of all of the other arms lie, means drivingly connecting both of said ground engaging wheels to the approximate mid-portion of said driven shaft spaced substantially equally from the opposite ends thereof for rotation of said driven shaft in response to movement of said pit plow over the ground, the last-mentioned means drivingly connecting said wheels to said driven shaft for rotation of the latter in a direction opposite to the direction of rotation of said wheels, and a hitch assembly carried by the forward end of said frame adapted for limited swiveled connection to a draft vehicle.

2. The combination of claim 1 wherein said drivingly connecting means includes an intermediate shaft journalled from said frame for rotation about an axis generally paralleling said driven shaft, a friction drum mounted on said driven shaft for rotation therewith, a friction wheel mounted on said intermediate shaft for rotation therewith and disposed in rolling contacting relation with said friction drum, and means drivingly connecting said ground-engaging wheel with said intermediate shaft.

3. The combination of claim 2 including means mounting said intermediate shaft for adjusted lateral movement toward and away from said driven shaft for selectively varying the frictional engagement of said friction wheel with said drum and selectively disengaging said friction wheel from driving engagement with said drum.

References Cited in the file of this patent

UNITED STATES PATENTS

| | | |
|---|---|---|
| 179,427 | Rouse | July 4, 1876 |
| 392,818 | Merrow | Nov. 13, 1888 |
| 453,121 | Lind | May 26, 1891 |
| 774,809 | Willis | Nov. 15, 1904 |
| 1,099,707 | Love | June 9, 1914 |
| 1,251,198 | Edwards | Dec. 25, 1917 |
| 1,650,400 | Stark | Nov. 22, 1927 |
| 1,855,326 | Terry | Apr. 26, 1932 |
| 2,205,752 | Silver | June 25, 1940 |
| 2,227,641 | Garey | Jan. 7, 1941 |
| 2,505,560 | Mayberry | Apr. 25, 1950 |
| 2,697,318 | Gomes | Dec. 21, 1954 |
| 3,090,188 | Gorham | May 21, 1963 |